3,430,548
RACK FOR USE IN DEVELOPING EXCEPTIONALLY WIDE FILM

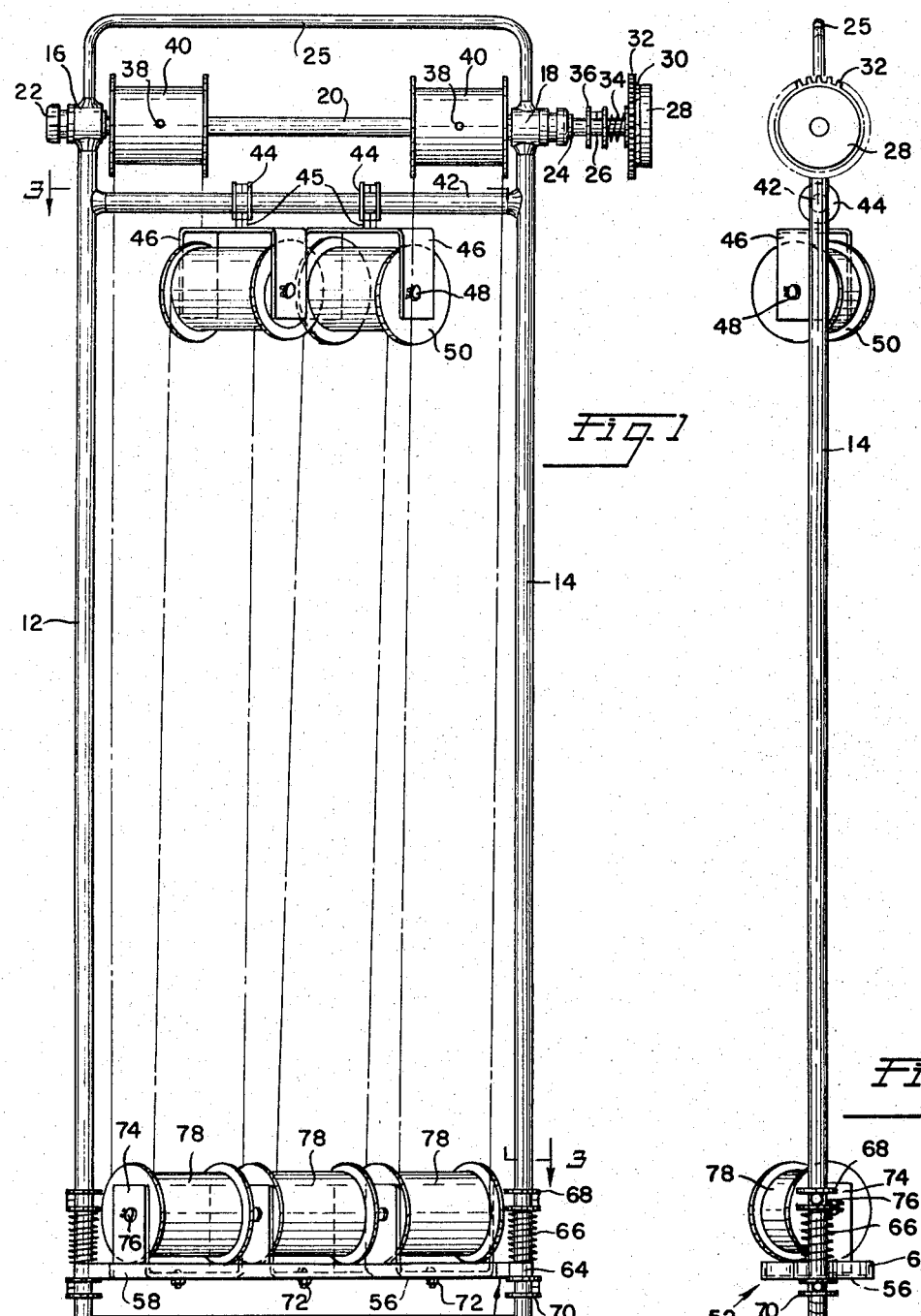

John L. Jiruska, 530 2nd St., Annapolis, Md. 21403
Filed Sept. 15, 1966, Ser. No. 579,536
U.S. Cl. 95—94        6 Claims
Int. Cl. G03d 3/12

This invention relates to photographic film processing apparatus and more particularly to rack construction for use in developing photographic film of extraordinary width.

In certain classes of modern day motion picture photography, for example high altitude photography, extraordinarily wide film is resorted to which may vary, for example, between 70 millimeters in width up to as much as 9 inches, it being well recognized that the wider the film the greater the fidelity of the photographic picture.

Developing film of such extreme width has created expensive problems, one of which is the fact that film of this width cannot as a practical matter be threaded helically around coaxially mounted upper and lower spools of conventional sized racks because of the undue strain and distortion which is placed on the edges of the film as it feeds off one spool in a slant line direction toward the next vertically spaced spool which must be offset laterally with respect to the first. It is because of this problem that conventional developing apparatus customarily employed for narrower film in the range of up to 32 millimeters simply cannot be used because the maximum spacing permitted by the depth of the tanks between the upper and lower spool shafts is insufficient to permit exceptionally wide film to feed onto and off of the respective spools without unacceptable film strain and distortion. Hence, heretofore, developing apparatus for film of great width has had to be especially constructed to provide tanks of very great depth in order to permit the use of racks whose upper and lower spool shafts are spaced sufficiently far apart to enable the film to properly feed in a helical path around the upper and lower coaxially mounted spools. Obviously, such specially constructed apparatus is expensive and is not readily adapted for use for films of smaller size.

The broad object of the present invention is to provide a rack construction for film developing apparatus which enables film of extraordinary width to be developed in apparatus of conventional size.

More particularly, it is the object of the present invention to provide a rack construction for an exceptionally wide film by providing individual upper and lower supports for idler spools so arranged that the respective spools may freely swivel about vertical axes into positions wherein the film feeds onto and off of the spools with substantially no edge-wise strain and without unacceptable twist or distortion of the film as it traverses the spools.

It is another object of the invention to provide a rack which accomplishes the foregoing and includes novel means for driving the film about the spools of the rack.

Other objects and their attendant advantages become apparent as the following detailed description is read in conjunction with the accompanying drawings wherein:

FIG. 1 is a front elevational view of a rack incorporating the features of the present invention;

FIG. 2 is a side elevational view of the rack of FIG. 1; and

FIG. 3 is a horizontal cross sectional view taken substantially on the line 3—3 of FIG. 1.

The rack of the present invention is similar in several respects to the rack disclosed in my Patent No. 3,261,278 to which reference is made, particularly for a description of the supporting and driving means for the racks which are substantially identical with those used in conjunction with the rack of the present invention. With reference to the drawings, the rack illustrated comprises a frame composed of a pair of vertical side bars 12, 14 joined together at their lower ends by a horizontal cross bar 16'. At the upper ends of the bars 12, 14 there are welded a pair of aligned bearing supports 16, 18 containing suitable bearing material such as high density polyethylene as shown and described in my earlier patent, which are adapted to receive the ends of the rotatable shaft 20 which extends on either side beyond the bearing supports 16, 18 to receive grooved hanger members 22, 24 which may be integral extensions of the bearing material in the supports 16, 18 and are adapted to nest in notched brackets (not shown) attached to the sides of the developing tanks as fully explained in Patent No. 3,261,278. Welded to the upper sides of the bearing supports 16, 18 are the lower ends of a shallow U-shaped handle 25 and at the right hand end of the shaft 20 as seen in FIG. 1, there is an integral extension 26 which carries at its outer end for rotation therewith a rigid disc 28 whose inner face has pressed thereagainst a clutch plate 30 whose opposite face is engaged by a loosely mounted sprocket wheel 32 which is urged against the clutch plate 30 by means of a spring 34 interposed between an adjustable collar 36 and the inner face of the sprocket wheel. As explained in my prior patent, the rack is designed to be supported in its position of use in a developing tank with the sprocket wheel 32 engaging an endless sprocket chain (not shown) which is guided in a suitable channel member directly beneath the sprocket wheel in a position such that the teeth of the latter engage the chain and are driven thereby to rotate the upper shaft 20. Carried on the upper shaft and fixed thereto by set screws 38 are a pair of laterally spaced driving spools 40 of a size to accommodate the film which is to be developed.

Rigidly fixed to the side members 12, 14 of the rack are the respective ends of a rigid rod 42 which is spaced vertically below the rod 20 a sufficient distance to accommodate the diameters of the driving spools 40. Carried on the rod 42 are bracket members 44 which pivotally support at 45 inverted U-shaped frame members 46 whose arms support therebetween short horizontal shafts 48, each of which carries an idler spool 50. The pivotal connection 45 is of the type which permits the frame members 46 to pivot freely in any direction about the vertical axes of the respective connections.

At the lower end of the rack there is provided a lower spool carrier 52 which is similar in many respects to the corresponding member shown and described in my Patent No. 3,261,278. The carrier shown comprises a flat horizontal plate 56 having shallow vertical upstanding side and end walls 58, 60, the latter having attached thereto as by screws 62 and portions 64 which may be of high density polyethylene and centrally notched on their outer side to be slidably received on the side members 12, 14 of the frame. The lower surfaces of the parts 64 are urged by springs 66, interposed between the upper surface of the part 64 and an adjustable collar 68, into abutting engagement with lower adjustable collars 70, the arrangement being such that the collars 68, 70 can be adjusted vertically anywhere along the side members 12, 14 and the springs 66 will yieldingly resist upward movement of the lower spools and carrier 52 should the film tend to shorten in length during transport.

Instead of there being a lower horizontal shaft coaxially supporting a plurality of side-by-side spools as in my earlier patent, the lower spool carrier 52 pivotally supports by means of pivotal connectors 72 a plurality of freely swivelable U-shaped bracket members 74, each of which carries between its vertical arms a short shaft 76 rotatably supporting a lower idler spool 78.

In operation, the film is threaded onto the spools of the rack by being first trained over one of the upper driving spools and thence downwardly to the lower spool directly beneath the first spool and from there the film is threaded over the first upper swivelly mounted spool 50 and from there back downwardly to the next lower swivelly mounted spool and this process is repeated over all of the swivelly mounted spools until the film is led off the last of the lower spools and is then trained over the second driving spool on the upper shaft 20 and led from there onto the driving spool of the next rack which may be in the same tank as the first rack or in the next tank containing a different developing solution.

After the film leader has been threaded onto all of the racks from the supply reel to the final take-up reel, sprocket wheels 32 are engaged with the endless driving sprocket chain and the machine is operated until slack in the film leader is taken up. As the tension of the leader or film increases all of the swivelly mounted spools at the top and bottom of the racks are rotated by the traveling film naturally to the position shown in FIG. 3 where it can be seen that the respective upper and lower spools become oppositely canted with respect to each other by the natural twist in the film with the total twist being evenly divided beween any pair of upper and lower swivelly mounted spools.

The division of swivelling between two sets of upper and lower mounted spools is a prime advantage of the present invention not only in that it permits, in the first instance, the use of standard sized racks with film of extraordinary width, but also by dividing the degree of film twist and hence spool swivel between two sets of spools, not only is there smoother film transport with less abrupt film distortion but also where the film is immensely wide, as on the order of 9 inches or so, the degree of spool cant is minimized so that racks in the same tank can be placed as closely together as possible without interference between the canted spools of the respective racks. Stated differently, with the arrangement of the invention, more racks per tank can be used than would be possible where only the lower spools are swivelly mounted. This is particularly important with film of extreme width because only a limited number of vertical runs per rack are feasible and thus as many racks as possible must often be inserted into each tank for proper developing. It is also important to minimize cant by dividing twist between upper and lower spools because the film feeds off of and onto adjacent racks at the same corresponding end of each so that spools on adjacent racks naturally cant in opposite directions which would increase the possibility of interference if the spools at only one and the same end of each rack were swivelled.

A feature of the present invention resides in the provision of two sets of upper and lower swivelly mounted spools along with means for positively driving the film from the upper end of the rack along the helical path defined by the spools. The present invention solves this difficulty by the provision of the upper horizontal shaft 20 carrying the pair of co-axially mounted driving spools 40 while spaced below this is a second shaft 42 supporting the upper swivelly mounted spools. This is an important advance which has solved the problem of having spools swivelly mounted at the same end of a rack where the driving power must be transmitted to the film to advance it over the spools.

What is claimed is:

1. A film rack comprising a frame including laterally spaced vertically extending side parts having upper and lower ends, a horizontally extending rotatable shaft adjacent the upper end of said side parts, means for driving said upper shaft, driving spool means carried by said shaft for rotation therewith, upper idler spool means swivelly connected to said frame adjacent the upper end thereof, and lower idler spool means swivelly connected to said frame in vertically spaced relationship below said upper idler spool means, the connections of said idler spool means with said frame being constructed and arranged to enable the respective spool means to freely swivel with respect to each other about individual vertical axes.

2. The film rack of claim 1 including a second horizontal shaft connected to said side parts in vertical spaced relationship below said rotatable shaft, and means swivelly connecting said upper idler spool means to said second shaft.

3. The film rack of claim 1 including relatively movable lower horizontal support means extending between said side parts in vertical spaced relationship below said upper idler spool means, and means swivelly connecting said lower idler spool means to said horizontal support means.

4. The film rack of claim 3 including releasable adjusting means for selectively establishing the vertical spacing of said support means for said lower spool means with respect to said upper spool means.

5. The film rack of claim 2 wherein said driving spool means comprise at least a pair of spools connected to said rotatable shaft for rotation therewith and adjacent the respective side parts of said frame.

6. The film rack of claim 1 including vertically spaced support members for said swivelly mounted idler spool means, said support members comprising horizontal elements extending between the side parts of said frame, and mounting means for the idler spool means comprising U-shaped frame members having a pair of horizontally spaced vertically extending arms and a horizontal part interconnecting said arms, spool shafts extending between said arms, swivel means centrally connected to said horizontal parts of said frame on the side thereof opposite said arms, and means connecting said swivel means to the respective horizontal support members.

References Cited

UNITED STATES PATENTS

| 1,837,223 | 12/1931 | Kohlmeier | 95—94 |
| 2,123,445 | 7/1938 | Van Leuven | 95—94 X |
| 2,169,758 | 8/1939 | Capstaff | 95—94 |
| 3,261,278 | 7/1966 | Jiruska | 95—94 |
| 3,370,801 | 2/1968 | Ames | 242—55.01 |

NORTON ANSHER, *Primary Examiner.*

CHARLES E. SMITH, *Assistant Examiner.*

U.S. Cl. X.R.

95—100